und States Patent (12) United States Patent
Hayashi (10) Patent No.: US 10,718,897 B2
(45) Date of Patent: Jul. 21, 2020

(54) OPTICAL FIBER TRANSMISSION SYSTEM (71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/117,567

(22) Filed: Aug. 30, 2018

(65) Prior Publication Data

US 2018/0372948 A1 Dec. 27, 2018

Related U.S. Application Data (63) Continuation of application No. PCT/JP2017/007600, filed on Feb. 28, 2017.

(30) Foreign Application Priority Data

Mar. 3, 2016 (JP) .................. 2016-041004

(51) Int. Cl.
G02B 6/02 (2006.01)
G02B 6/028 (2006.01)
(Continued)

(52) U.S. Cl.
CPC ............ G02B 6/0288 (2013.01); G02B 6/02 (2013.01); G02B 6/028 (2013.01); G02B 6/036 (2013.01);
(Continued)

(58) Field of Classification Search
CPC .. G02B 6/0288; G02B 6/0365; G02B 6/0281; G02B 6/03627; G02B 6/028; G02B 6/02
See application file for complete search history.

(56) References Cited

U.S. PATENT DOCUMENTS 9,513,431 B2* 12/2016 Hayashi ............ G02B 6/02042
2013/0301998 A1* 11/2013 Hayashi ............ G02B 6/02042
385/100
2014/0064886 A1* 3/2014 Toshima ............... H01L 21/677
414/221

FOREIGN PATENT DOCUMENTS

EP 2743742 A1 6/2014
JP 2013-175831 A 9/2013
(Continued)

OTHER PUBLICATIONS

Massimiliano Salsi et al., "Mode Division Multiplexed Transmission with a weakly-coupled Few-Mode Fiber," OFC/NFOEC Technical Digest, 2012, Otu2C.5, pp. 1-3.
(Continued)

Primary Examiner — Jennifer Doan
(74) Attorney, Agent, or Firm — Faegre Drinker Biddle & Reath LLP (57) ABSTRACT An object is to provide an optical fiber transmission system that has a structure for effectively reducing inter-mode XT while reducing an increase in processing load in a MIMO configuration. For a transmission line that allows propagation of at least three degenerate spatial mode groups in at least one core or core group, an embodiment of crosstalk reducing means limits input of an optical signal to at least one of spatial mode groups having a transmission loss of 1 dB/km or less, except a spatial mode group having the smallest propagation constant.

10 Claims, 6 Drawing Sheets (51) Int. Cl.
   *G02B 6/036* (2006.01)
   *H04B 10/2507* (2013.01)
   *H04B 10/2581* (2013.01)
   *H04J 14/04* (2006.01)

(52) U.S. Cl.
   CPC ..... *H04B 10/2507* (2013.01); *H04B 10/2581* (2013.01); *H04J 14/04* (2013.01)

(56) References Cited

FOREIGN PATENT DOCUMENTS

| | | |
|---|---|---|
| JP | 2015-515765 A | 5/2015 |
| WO | WO-2013/021697 A1 | 2/2013 |
| WO | WO-2013/126254 A1 | 8/2013 |

OTHER PUBLICATIONS

Koji Igarashi et al., "114 Space-Division-Multiplexed Transmission over 9.8-km Weakly-Coupled-6-Mode Uncoupled-19-Core Fibers," OFC Postdeadline Papers, 2015, Th5C.4, 3 pages.

D. Soma et al., "2.05 Peta-bit/s Super-Nyquist-WDM SDM Transmission Using 9.8-km 6-mode 19-core Fiber in Full C band," ECOC, 2015, PDP.3.2, 3 pages.

Stefan Warm et al., "Splice loss requirements in multi-mode fiber mode-division-multiplex transmission links," Optics Express, 2013, pp. 519-532, vol. 21, No. 1.

\* cited by examiner

OPTICAL FIBER TRANSMISSION SYSTEM

CROSS-REFERENCE TO RELATED APPLICATIONS

This is a continuation application of PCT/JP2017/007600 claiming the benefit of the Japanese Patent Application No. 2016-041004 filed on Mar. 3, 2016, which is incorporated by reference herein in its entirety.

TECHNICAL FIELD

The present invention relates to a MIMO-based optical fiber transmission system that performs weakly-coupled mode division multiplexed transmission.

BACKGROUND ART

"Mode Division Multiplexed Transmission with a weakly-coupled Few-Mode Fiber", OFC/NFOEC Technical Digest 2012 OTu2C.5, by Massimiliano Salsi, et al. (Non Patent Literature 1) discloses an optical fiber transmission system that is capable of performing weakly-coupled mode division multiplexed transmission using, as a transmission line, a few-mode fiber with reduced crosstalk (hereinafter referred to as "XT") between spatial modes. Instead of adopting a multi-input-multi-output (MIMO) configuration involving collective input and output of all spatial modes, this system adopts a MIMO configuration for each of four LP modes, LP01, LP11, LP21, and LP02.

Examples of an optical fiber that can be used as a transmission line for mode division multiplexed transmission include not only multi-mode fibers, such as few-mode fibers, but also include multi-core fibers (hereinafter referred to as "MCFs"). For example, "114 Space-Division-Multiplexed Transmission over 9.8-km Weakly-Coupled-6-Mode Uncoupled-19-Core Fibers", OFC Postdeadline Papers 2015 Th5C.4, by Koji Igarashi, et al. (Non Patent Literature 2) discloses an optical fiber transmission system that is capable of performing weakly-coupled mode division multiplexed transmission using, as a transmission line, an MCF with 19 cores (hereinafter, MCF with "n" cores is referred to as "n-core MCF") each configured to guide six LP modes (four degenerate LP modes). Instead of adopting a MIMO configuration for each of the LP modes, this system adopts a MIMO configuration for LP01 mode and LP11 mode and a MIMO configuration for LP21 mode and LP02 mode. Spatial modes guided in the 19-core MCF are the following six LP modes: LP01 and LP11 (identifiable by two degenerate modes, even mode LP11a and odd mode LP11b, having the same propagation constant), LP21 (even mode LP21a and odd mode LP21b), and LP02.

Also, "2.05 Peta-bit/s Super-Nyquist-WDM SDM Transmission Using 9.8-km 6-mode 19-core Fiber in Full C band", ECOC 2015 PDP.3.2 by D. Soma, et al. (Non Patent Literature 3) discloses an optical fiber transmission system that uses, as a transmission line, a 19-core MCF with cores each configured to guide the six LP modes disclosed in Non Patent Literature 2. This system adopts a MIMO configuration which involves collective input and output of all spatial modes. The MIMO configuration involving collective input and output of all spatial modes is adopted here, because adopting a MIMO configuration for each spatial mode group results in insufficient XT compensation.

"Splice loss requirements in multi-mode fiber mode-division-multiplex transmission links", OPTICS EXPRESS 2013 Vol. 21, No. 1 519, by Stefan Warm and Klaus Petermann (Non Patent Literature 4) discloses a mode division multiplexed transmission system that uses, as a transmission line, an optical fiber which is not limited to a weakly-coupled fiber. It has been pointed out that in view of mode dependent loss (MDL) and inter-mode loss difference during connection of optical fibers forming a transmission line, it is necessary in this system to reduce axial offset during fiber connection.

SUMMARY OF INVENTION

Technical Problem

An object of the present invention is to provide an optical fiber transmission system that has a structure for effectively reducing inter-mode crosstalk while reducing an increase in processing load in a MIMO configuration.

Solution to Problem

The present invention provides a MIMO-based optical fiber transmission system that performs mode division multiplexed transmission and includes a transmission line including an optical fiber, at least two transmitters, at least two receivers, and input-end crosstalk reducing means. In a basic aspect, the optical fiber includes at least one core or core group and one cladding surrounding the at least one core or core group, and is configured to allow M degenerate spatial mode groups to propagate in the at least one core or core group, where M is greater than or equal to three. The transmitters are disposed adjacent to an input end of the transmission line and configured to output different optical signals to the spatial mode groups. The receivers are disposed adjacent to an output end of the transmission line in such a manner as to correspond to the at least two transmitters. The receivers are each configured to receive an optical signal being output by a corresponding one of the transmitters and propagated in the spatial mode groups through the transmission line. The input-end crosstalk reducing means is configured to limit, on the side of the input end of the transmission line, input of an optical signal to at least one spatial mode group having a propagation constant larger than the smallest of propagation constants of respective spatial mode groups used for signal transmission, the at least one spatial mode group being not used for signal transmission. With this configuration, in the at least one core or core group, the optical transmission line of the present invention transmits signals using (M−1) or less of the M spatial mode groups.

In an aspect, the M degenerate spatial mode groups may include at least three LP modes, and the input-end crosstalk reducing means may limit input of an optical signal to LP11 mode. In another aspect, in the transmission line, intermediate crosstalk reducing means may be provided which is for reducing or eliminating light in the spatial mode group to which input of an optical signal is limited. The intermediate crosstalk reducing means is configured to reduce or eliminate the light in such a manner that a ratio of intensity of the light to light intensity in spatial mode groups to which other optical signals are input does not exceed a predetermined value.

In another aspect, the at least one core or core group may be at least one core, and a refractive index profile of the at least one core may be a single peak profile. In this case, the refractive index profile of the at least one core may be an α-power profile, and a may satisfy 1.8<α<2.2. Alternatively, the refractive index profile of the at least one core may be a ring-type profile.

In another aspect, the at least one core or core group may be surrounded by a trench layer having a lower refractive index than the cladding. In another aspect, the optical fiber transmission system according to the present invention may include two or more cores or core groups.

In another aspect, the optical fiber transmission system may have a MIMO configuration which does not involve crosstalk compensation between non-degenerate modes and involves inter-mode crosstalk compensation for each of the degenerate spatial mode groups.

Advantageous Effects of Invention

The optical fiber transmission system according to the present invention can effectively reduce inter-mode crosstalk while reducing an increase in processing load in a MIMO configuration. In particular, when the transmission line includes a plurality of optical fibers arranged in sequence along the direction of travel of optical signals, the level of inter-mode crosstalk increases depending on the amount of inter-fiber axial offset at the connection portion (butt joint) between adjacent ones of the optical fibers. The present invention is expected to reduce such dependency of inter-mode crosstalk on the amount of axial offset.

DESCRIPTION OF EMBODIMENTS

A structure of an optical fiber transmission system according to the present invention will now be described with reference to the drawings. The present invention is not limited to embodiments described herein and is defined by the appended claims. All changes that fall within meanings and scopes equivalent to the claims are therefore intended to be embraced by the claims.

It is difficult to apply any of the optical fiber transmission systems disclosed in Non Patent Literatures 1 to 4 to long-distance transmission which requires many fiber connection points (i.e., butt joints between fibers) in the transmission line. The present inventor has discovered that since inevitable occurrence of very small axial offset between cores at any fiber connection point may cause inter-mode crosstalk (hereinafter "crosstalk" will be referred to as "XT"), a MIMO configuration which involves collective input and output of all spatial modes increases processing load.

Figure 1:
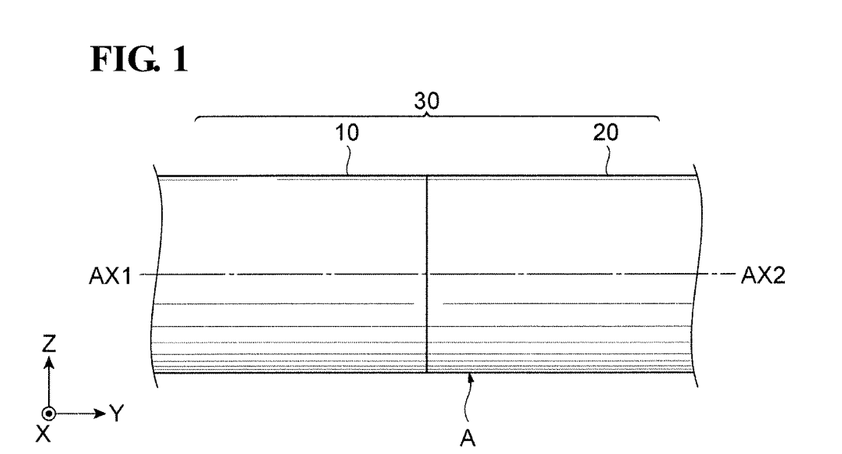
FIG. 1 is a side view illustrating how two optical fibers forming a transmission line included in an optical fiber transmission system according to an embodiment of the present invention are butt-joined.

FIG. 1 is a side view illustrating how optical fibers 10 and 20 forming a transmission line 30 included in an optical fiber transmission system according to an embodiment of the present invention are butt-joined. The transmission line 30 includes at least one core or core group and a cladding that surrounds the core or core group. At the same time, the transmission line 30 is composed of at least two optical fibers that allow at least three degenerate spatial mode groups to propagate in the core or core group. At a fiber connection point A, the optical fiber 10 and the optical fiber 20 are optically connected in such a manner that a central axis AX1 of the optical fiber 10 and a central axis AX2 of the optical fiber 20 are aligned, with their cores being in a one-to-one correspondence.

Figure 2:
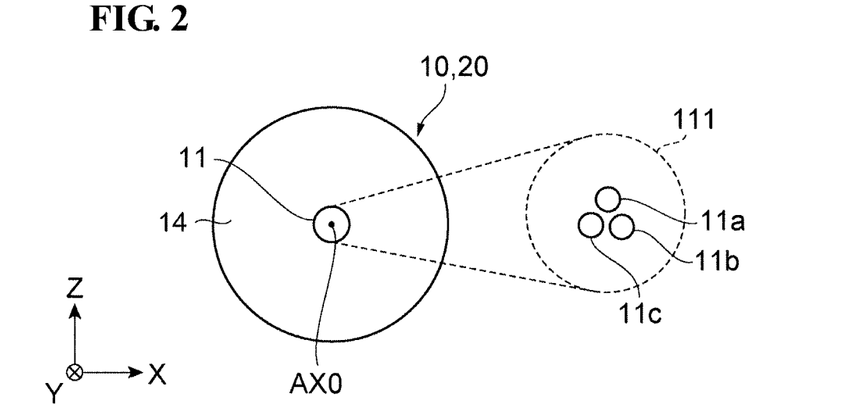
FIG. 2 is a cross-sectional view of an exemplary optical fiber forming the transmission line illustrated in FIG. 1.
Figure 9:
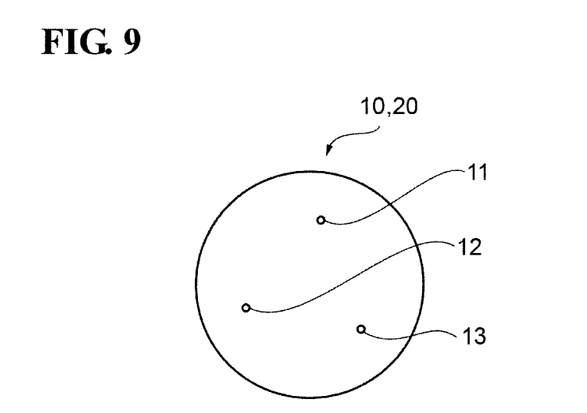
FIG. 9 is a cross-sectional view of another exemplary optical fiber forming the transmission line illustrated in FIG. 1.
Figure 10:
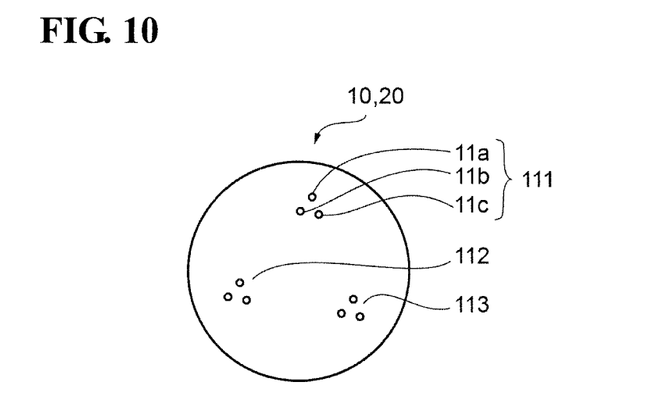
FIG. 10 is a cross-sectional view of another exemplary optical fiber forming the transmission line illustrated in FIG. 1.

FIG. 2 is a cross-sectional view of either of the optical fibers 10 and 20 forming the transmission line 30. FIG. 2 shows, on the left side, a single core 11 and a cladding 14 surrounding the core 11. As shown on the right side of FIG. 2, the core 11 may be a core group (combined core) 111 including a plurality of core elements 11a to 11c. The optical fibers 10 and 20 may each be a multi-core fiber (MCF) (see FIG. 9) including a plurality of cores 12 and 13 having the same structure as the core 11, or may each be an MCF (see FIG. 10) including a plurality of core groups 111, 112, and 113 having the same structure.

Figure 3:
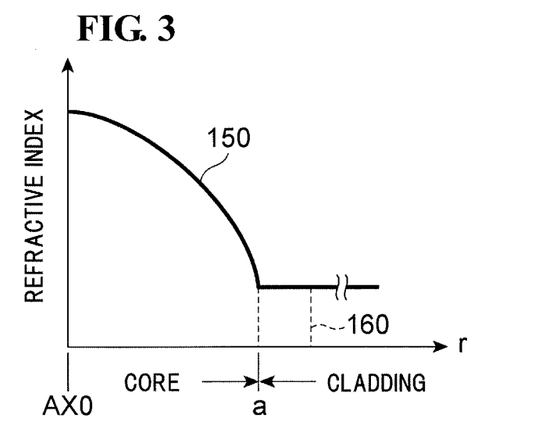
FIG. 3 is a graph showing a refractive index profile in and around a core in a cross-section perpendicular to an optical axis of the optical fiber illustrated in FIG. 2.

FIG. 3 is a graph showing a refractive index profile 150 in and around the core 11 in a cross-section perpendicular to an optical axis AX0 of the optical fibers 10 and 20. The core 11 has a radius "a" and extends along the optical axis AX0. The refractive index profile 150 is an α-power profile, which is a typical single peak refractive index profile. The refractive index profile 150 can be expressed by the following equation (1):

$$n(r) = \begin{cases} n_1 \sqrt{1 - 2\Delta\left(\frac{r}{a}\right)^\alpha} & r \le a \\ n_1 \sqrt{1 - 2\Delta} & r > a \end{cases} \quad (1)$$

where "r" is a distance from the center of the core 11. An α value for defining the shape of the refractive index profile satisfies 1.8<α<2.2. A relative refractive index difference Δ of the core 11 (refractive index n1) to the cladding 14 (refractive index n2) can be expressed by the following equation (2):

$$\Delta = \frac{n_1^2 - n_2^2}{2n_1^2}. \quad (2)$$

With the α-power profile, a differential mode group delay (DMGD) can be reduced.

Figure 11:
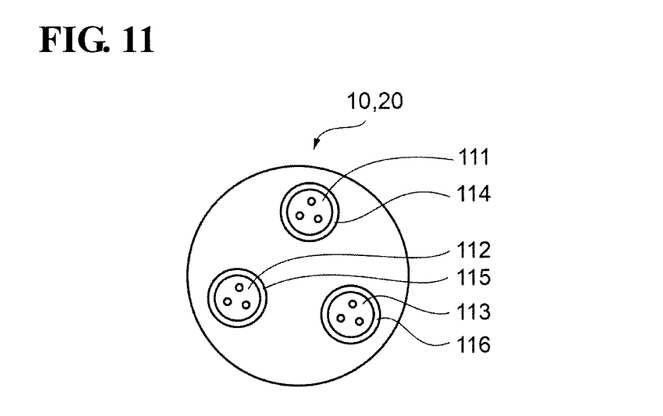
FIG. 11 is a cross-sectional view of another exemplary optical fiber forming the transmission line illustrated in FIG. 1.

When the optical fibers 10 and 20 each include one or more cores 11, the outer periphery of each core 11 may be provided with a trench having a refractive index lower than that of the cladding 14. In this case, the refractive index profile 150 in and around the core 11 of either of the optical fibers 10 and 20 has a recessed portion 160 corresponding to the trench, as indicated by a broken line. When the optical fibers 10 and 20 each include one or more core groups 111, 112, and 113, the outer peripheries of the core groups 111, 112, and 113 may be provided with trenches 114, 115, and 116, respectively, having a refractive index lower than that of the cladding 14 (see FIG. 11).

Figure 4:
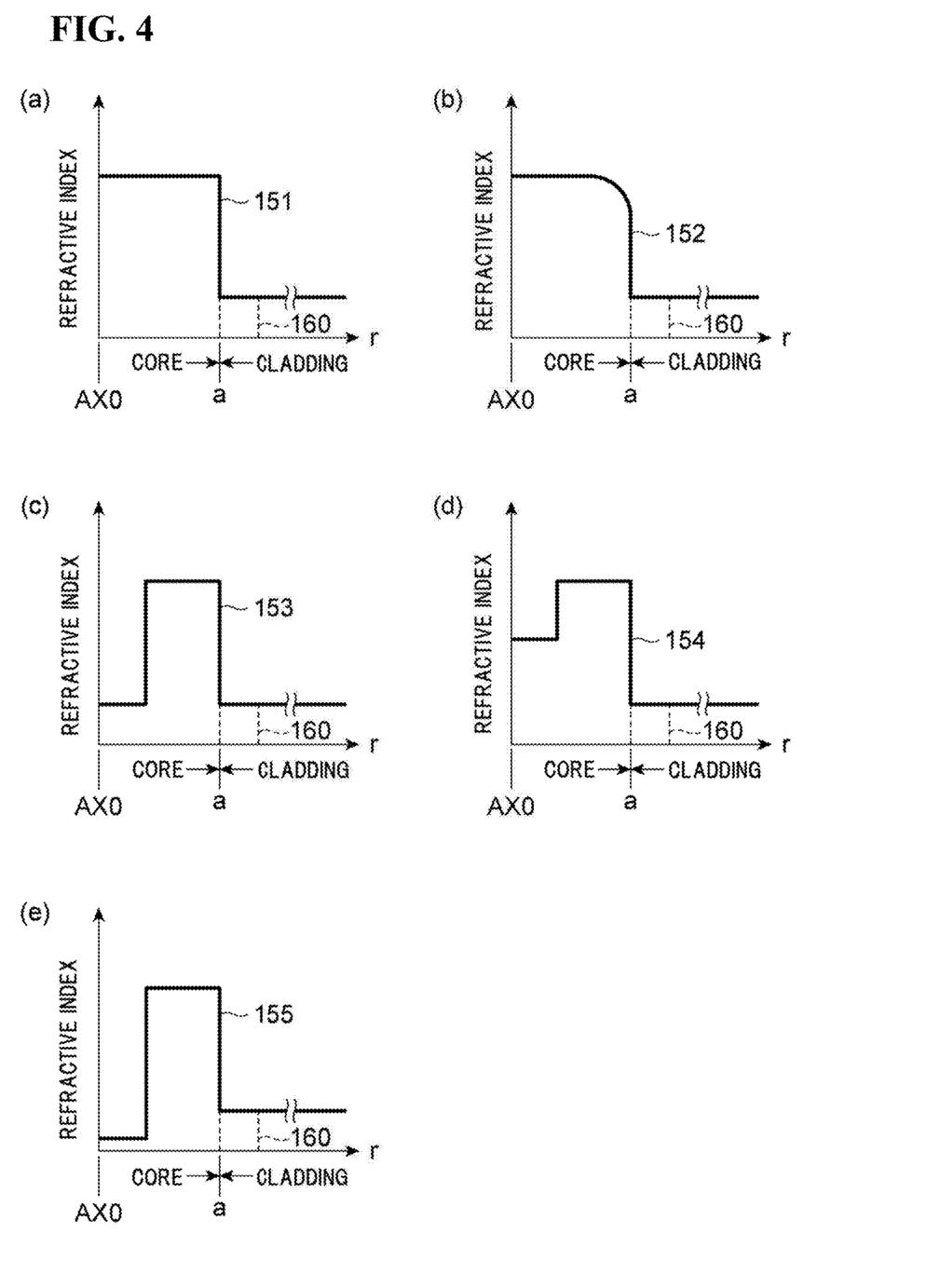
FIG. 4 presents graphs showing other examples of the refractive index profile in and around the core of the optical fiber illustrated in FIG. 2.

FIG. 4 presents graphs showing other examples of the refractive index profile in and around the core 11 of either of the optical fibers 10 and 20. The refractive index profile in and around the core 11 of either of the optical fibers 10 and 20 is not limited to a single peak and α-power profile (refractive index profile 150), and refractive index profiles of various types are applicable.

For example, a step-index refractive index profile 151 (see area (a)) or a refractive index profile 152 (see area (b)) characterized by an abrupt change in refractive index at around a core-cladding interface may be applied. Instead of a single peak refractive index profile, a ring-type refractive index profile (see areas (c) to (e)) is applicable, which is characterized in that the refractive index in the core's center region including the optical axis AX0 is set to be lower than the refractive index in the core's outer region. In a refractive index profile 153 (see area (c)), the refractive index in the core's center region is equal to the refractive index of the cladding. In a refractive index profile 154 (see area (d)), the refractive index in the core's center region is set to be higher than the refractive index of the cladding. In a refractive index profile 155 (see area (e)), the refractive index in the core's center region is set to be lower than the refractive index of the cladding. When the outer periphery of the core is provided with a trench as described above, the refractive index profiles 151 to 155 each have the recessed portion (corresponding to the trench having a refractive index lower than that of the cladding) 160 indicated by a broken line.

Figure 5:
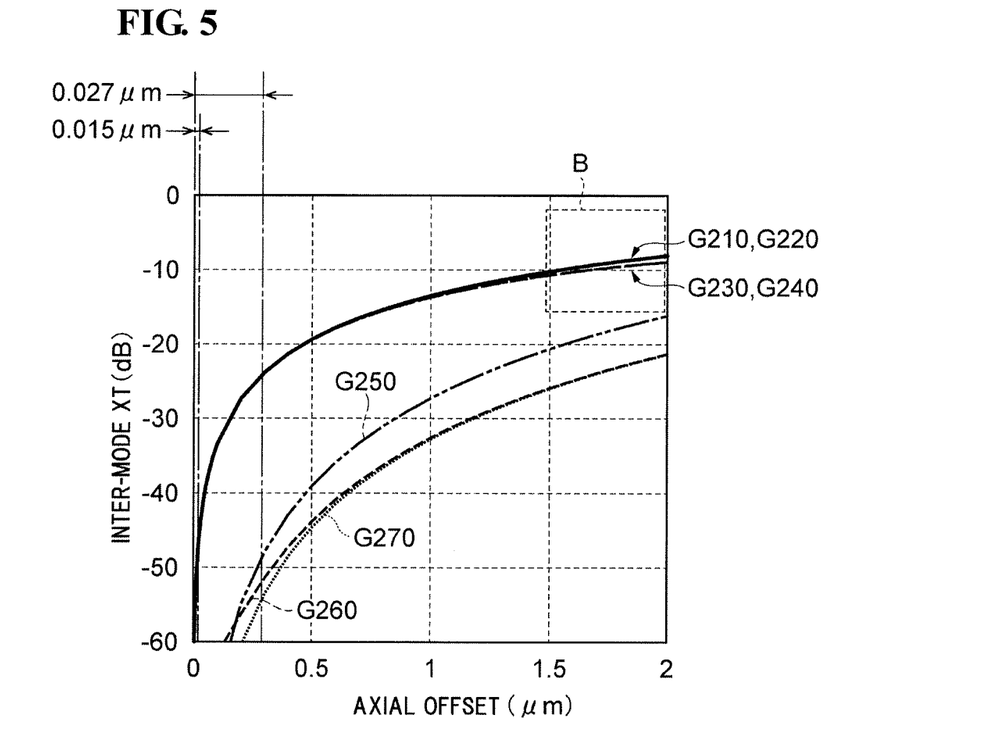
FIG. 5 is a graph showing a relationship between inter-mode crosstalk and axial offset at a connection point between the two optical fibers illustrated in FIG. 1.
Figure 6:
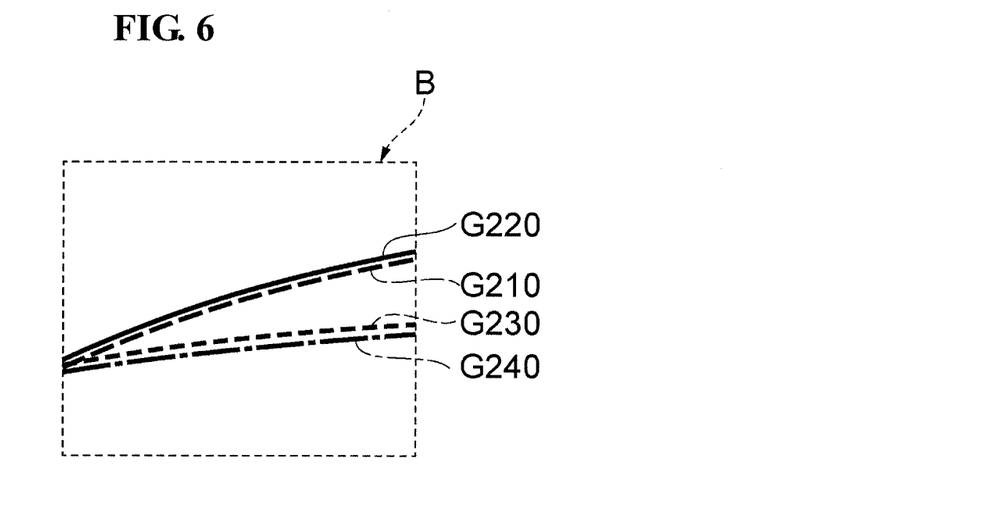
FIG. 6 is an enlarged view of part of FIG. 5.

FIG. 5 is a graph showing a relationship between inter-mode XT and axial offset at the connection point A between the optical fibers 10 and 20. FIG. 6 is an enlarged view of region B in FIG. 5. The axial offset refers to the amount of offset in a direction parallel to end faces of the respective cores of the optical fibers 10 and 20 which are in a one-to-one correspondence.

The optical fibers 10 and 20 that are used each include the core 11 having a shape defined by an α-power profile, or more specifically, by Δ=1.08%, a=8.7 μm, and α=2 in equation (1). Spatial modes used to measure inter-mode XT are four LP modes, LP01, LP11, LP21, and LP02, having a transmission loss of 1 dB/km or less. LP11 mode and LP21 mode each have two types of degenerate modes having the same propagation constant. That is, on the basis of parity in angular dependency, LP11 mode has degenerate modes, even mode LP11a and odd mode LP11b, and similarly LP21 mode has degenerate modes, even mode LP21a and odd mode LP21b. Therefore, by measuring XT between these modes, XT between four degenerate LP modes (LP01, LP11a, LP11b, LP21a, LP21b, and LP02) of the optical fibers 10 and 20 is detected.

In FIGS. 5 and 6, curve G210 represents inter-mode XT between LP01 mode and LP11b mode, curve G220 represents inter-mode XT between LP11a mode and LP21a mode, curve G230 represents inter-mode XT between LP11b mode and LP21b mode, curve G240 represents inter-mode XT between LP11b mode and LP02 mode, curve G250 represents inter-mode XT between LP21 b mode and LP02 mode, curve G260 represents inter-mode XT between LP01 mode and LP02 mode, and curve G270 represents inter-mode XT between LP01 mode and LP21b mode.

In transmission experiments, transmission through a seamless (continuous) optical fiber with a length of several tens of kilometers is possible. However, a transmission line laid in practice typically requires a connection point of optical fibers every 1 or 2 km. In this case, transmission of optical signals about 100 km to 200 km requires about 100 fiber connection points. To reduce inter-mode XT after the 100- to 200-km transmission to −30 dB or less, it is necessary to reduce inter-mode XT at each fiber connection point A to −50 dB or less.

To reduce inter-mode XT at each fiber connection point A to −50 dB or less in the cases of curves G210 to G240, the fiber connection needs to be made with an axial offset as unrealistically small as 0.015 μm or less. However, in the cases curves G210 to G240, each representing XT that increases at a particularly small axial offset, XT is one that occurs between LP11 mode (LP11a mode or LP11b mode) and another LP mode. Accordingly, optical fiber transmission systems 100 and 200 according to first and second embodiments (described below) are configured in such a manner that LP11 mode is not used for mode division multiplexed transmission and that only LP01 mode, LP21 mode (LP21a mode and LP21b mode), and LP02 mode can be used for mode division multiplexed transmission.

With this configuration, the axial offset at which XT between LP21b and LP02 is −50 dB, is 0.27 μm (≈0.031a) or less. Thus, with this realistically achievable axial offset in fiber connection, mode division multiplexed transmission with sufficiently reduced inter-mode XT is possible. Similarly, the axial offset at which XT between LP01 and LP21b is −50 dB, is 0.37 μm (≈0.043a), and the axial offset at which XT between LP01 and LP02 is −50 dB, is 0.33 μm (≈0.038a).

First Embodiment

Figure 7:
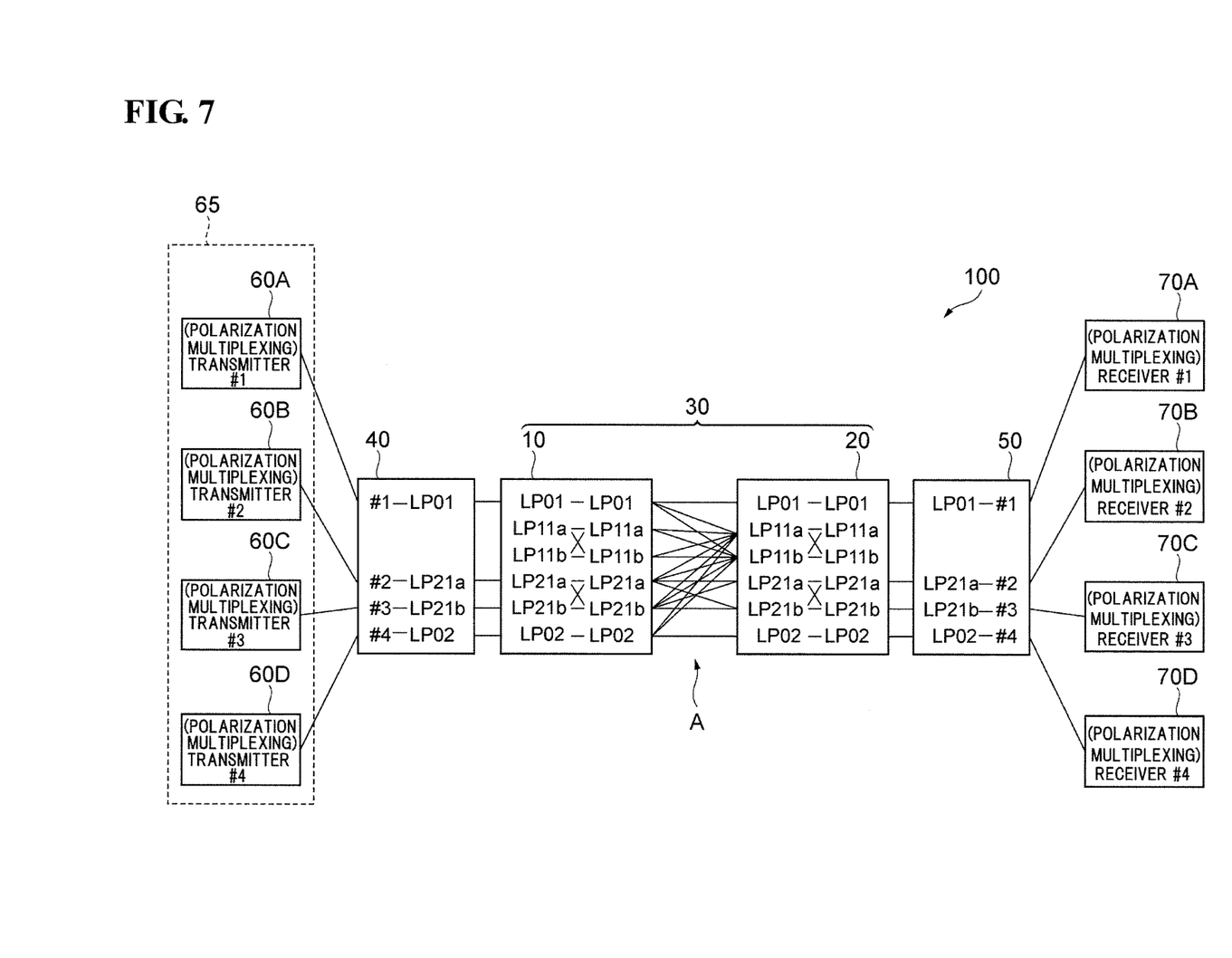
FIG. 7 is a conceptual diagram illustrating a configuration of an optical fiber transmission system according to a first embodiment.

FIG. 7 is a conceptual diagram illustrating a configuration of the optical fiber transmission system 100 according to the first embodiment. The optical fiber transmission system 100 is a MIMO-based transmission system that enables weakly-coupled mode division multiplexed transmission. The optical fiber transmission system 100 includes a first mode eliminating unit 65 (input-end crosstalk reduction means) that limits the output of an optical signal to LP11 mode (LP11a mode and LP11b mode which are degenerate modes).

The optical fiber transmission system 100 includes the transmission line 30, transmitters (polarization multiplexing transmitters #1 to #4) 60A to 60D, a transmitting-side spatial division multiplexing (SDM) multiplexer 40, a receiving-side SDM multiplexer 50, and receivers (polarization multiplexing receivers #1 to #4) 70A to 70D. The transmission line 30 is formed by the optical fibers 10 and 20 butted to each other at the fiber connection point A.

The transmitters 60A to 60D output optical signals to degenerate LP modes (LP01, LP21a, LP21b, and LP02) used for mode division multiplexed transmission, and not to LP11a mode and LP11b mode. The transmitting-side SDM multiplexer 40 is disposed between the transmitters 60A to 60D and the input end of the transmission line 30 and configured to guide the optical signals output from the transmitters 60A to 60D to the transmission line 30, as mode beams used for mode division multiplexed transmission (mode multiplexing). The receiving-side SDM multiplexer 50 is disposed adjacent to the output end of the transmission line 30 and configured to divide the mode beams propagated in the transmission line 30 into the receivers 70A to 70D provided in a one-to-one correspondence with the transmitters 60A to 60D (mode division).

In the first embodiment, the first mode eliminating unit 65 limits the output of an optical signal to LP11 mode (LP11a mode and LP11b mode which are degenerate modes) by, for example, turning on and off each of the plurality of transmitters. The first mode eliminating unit 65 may be configured to limit the output of an optical signal to LP11 mode with an optical switch or mode conversion means added between the plurality of transmitters and the transmitting-side SDM multiplexer.

Second Embodiment

Figure 8:
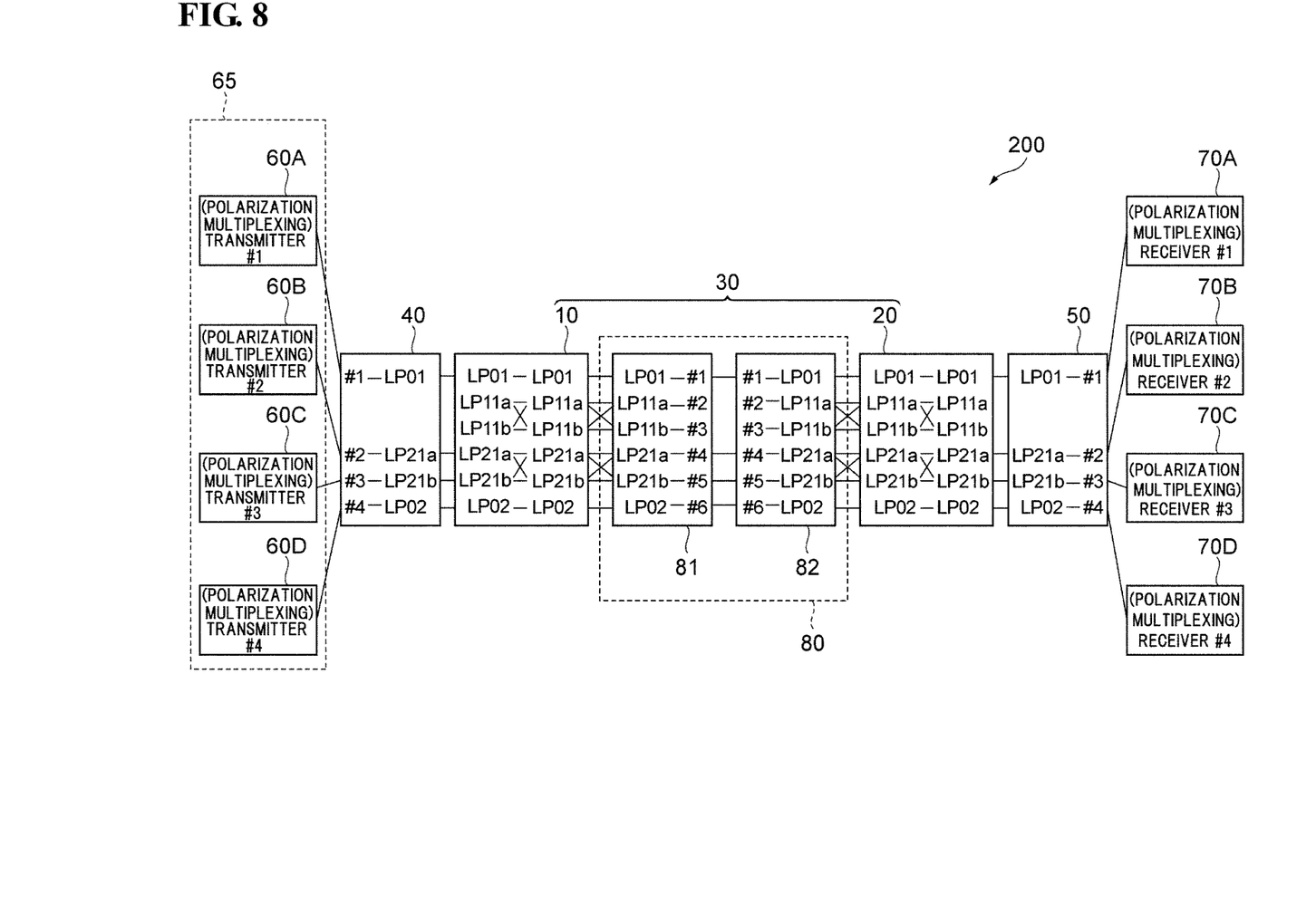
FIG. 8 is a conceptual diagram illustrating a configuration of an optical fiber transmission system according to a second embodiment.

FIG. 8 is a conceptual diagram illustrating a configuration of the optical fiber transmission system 200 according to the second embodiment. The optical fiber transmission system 200 is also a MIMO-based transmission system that enables weakly-coupled mode division multiplexed transmission. The optical fiber transmission system 200 differs from the optical fiber transmission system 100 in that it includes a second mode eliminating unit 80 (intermediate crosstalk reduction means) at the fiber connection point A between the optical fibers 10 and 20 forming the transmission line 30.

In the second embodiment, as in the first embodiment, the first mode eliminating unit 65 limits the output of an optical signal to LP11 mode. Even in this state, however, inter-mode XT may cause light (XT light) in LP11 mode (LP11a mode and LP11b mode) to propagate in the transmission line 30. Accordingly, in the second embodiment, the second mode eliminating unit 80 is provided at the fiber connection point A in the transmission line 30. The second mode eliminating unit 80 reduces or eliminates light in such a manner that the ratio of light intensity in LP mode to which input of an optical signal is limited, to light intensity in spatial modes (LP01, LP21, and LP02) to which other optical signals are input, does not exceed a predetermined value.

The second mode eliminating unit 80 includes a first SDM multiplexer 81 and a second SDM multiplexer 82 arranged in sequence along the direction from the optical fiber 10 toward the optical fiber 20. The first SDM multiplexer 81 divides all spatial modes propagated in the optical fiber 10. On the other hand, the second SDM multiplexer 82 selectively limits the input of LP11 mode (LP11a mode and LP11b mode) not used for the mode division multiplexed transmission, of all the spatial modes output from the first SDM multiplexer 81. The second SDM multiplexer 82 then outputs LP mode beams in the input LP01, LP21a, LP21b, and LP02 to the optical fiber 20 (mode multiplexing). Instead of this configuration, for example, mode conversion means may be used as the second mode eliminating unit 80.

With the configurations described above, the optical fiber transmission system of the present invention can reduce crosstalk between non-degenerate LP modes having an effective refractive index difference of at least $2 \times 10^{-3}$ and can perform MIMO signal transmission without crosstalk compensation. For transmission without crosstalk compensation, when there are a plurality of degenerate LP modes (degenerate spatial mode groups) having an effective refractive index difference of $1 \times 10^{-3}$ or less, it is necessary to treat the plurality of degenerate LP modes as one spatial channel, because crosstalk occurs between these LP modes during propagation in optical fibers. Accordingly, with a MIMO configuration which does not involve crosstalk compensation between non-degenerate modes and involves inter-mode crosstalk compensation for each degenerate spatial mode group, the load of MIMO calculation can be made much smaller and the number of spatial channels per optical fiber can be made smaller, than those when crosstalk compensation is performed collectively for all spatial modes.

It is obvious from the description of the present invention that various modifications can be made to the present invention. Such modifications should not be deemed departing from the concept and scope of the present invention. Improvements that are obvious to those skilled in the art are all embraced by the appended claims.

What is claimed is:

1. An optical fiber transmission system that performs mode division multiplexed transmission, the system comprising:
a transmission line including an optical fiber including at least one core or core group and one cladding surrounding the at least one core or core group, the optical fiber being configured to allow M degenerate spatial mode groups to propagate in the at least one core or core group, with M being greater than or equal to three;
at least two transmitters disposed adjacent to an input end of the transmission line and configured to output different optical signals to the spatial mode groups;
at least two receivers disposed adjacent to an output end of the transmission line corresponding to the at least two transmitters, the receivers each being configured to receive an optical signal being output by a corresponding one of the transmitters and propagated in the spatial mode groups through the transmission line; and
input-end crosstalk reducing means for limiting, on the side of the input end of the transmission line, input of an optical signal to at least one spatial mode group having a propagation constant larger than the smallest of propagation constants of respective spatial mode groups used for signal transmission, the at least one spatial mode group being not used for signal transmission,
wherein in the at least one core or core group, the optical fiber transmission system transmits signals using (M−1) or less of the M spatial mode groups.

2. The optical fiber transmission system according to claim 1, wherein
the M degenerate spatial mode groups include at least three LP modes; and
the input-end crosstalk reducing means limits input of an optical signal to LP11 mode of the LP modes.

3. The optical fiber transmission system according to claim 1, further comprising,
in the transmission line, intermediate crosstalk reducing means for reducing or eliminating light in the spatial mode group to which input of an optical signal is limited in such a manner that a ratio of intensity of the light to light intensity in spatial mode groups to which other optical signals are input does not exceed a predetermined value.

4. The optical fiber transmission system according to claim 1, wherein
the at least one core or core group is at least one core, and a refractive index profile of the at least one core is a single peak profile.

5. The optical fiber transmission system according to claim 4, wherein
   the refractive index profile of the at least one core is an α-power profile.
6. The optical fiber transmission system according to claim 5, wherein
   the α-power profile has a shape that satisfies $1.8<\alpha<2.2$.
7. The optical fiber transmission system according to claim 1, wherein
   the at least one core or core group is at least one core, and a refractive index profile of the at least one core is a ring-type profile.
8. The optical fiber transmission system according to claim 1, wherein
   the optical fiber includes a trench layer surrounding the at least one core or core group, the trench layer having a lower refractive index than the cladding.
9. The optical fiber transmission system according to claim 1, wherein
   the at least one core or core group includes at least two cores or core groups.
10. The optical fiber transmission system according to claim 1, wherein
   the optical fiber transmission system has a MIMO configuration which does not involve crosstalk compensation between non-degenerate modes and involves inter-mode crosstalk compensation for each of the degenerate spatial mode groups.

\* \* \* \* \*